July 27, 1965  E. D. GRANGE  3,196,938
MATERIAL PROCESSING VESSELS OF THE ROTARY TYPE
Filed Nov. 6, 1961  2 Sheets-Sheet 1
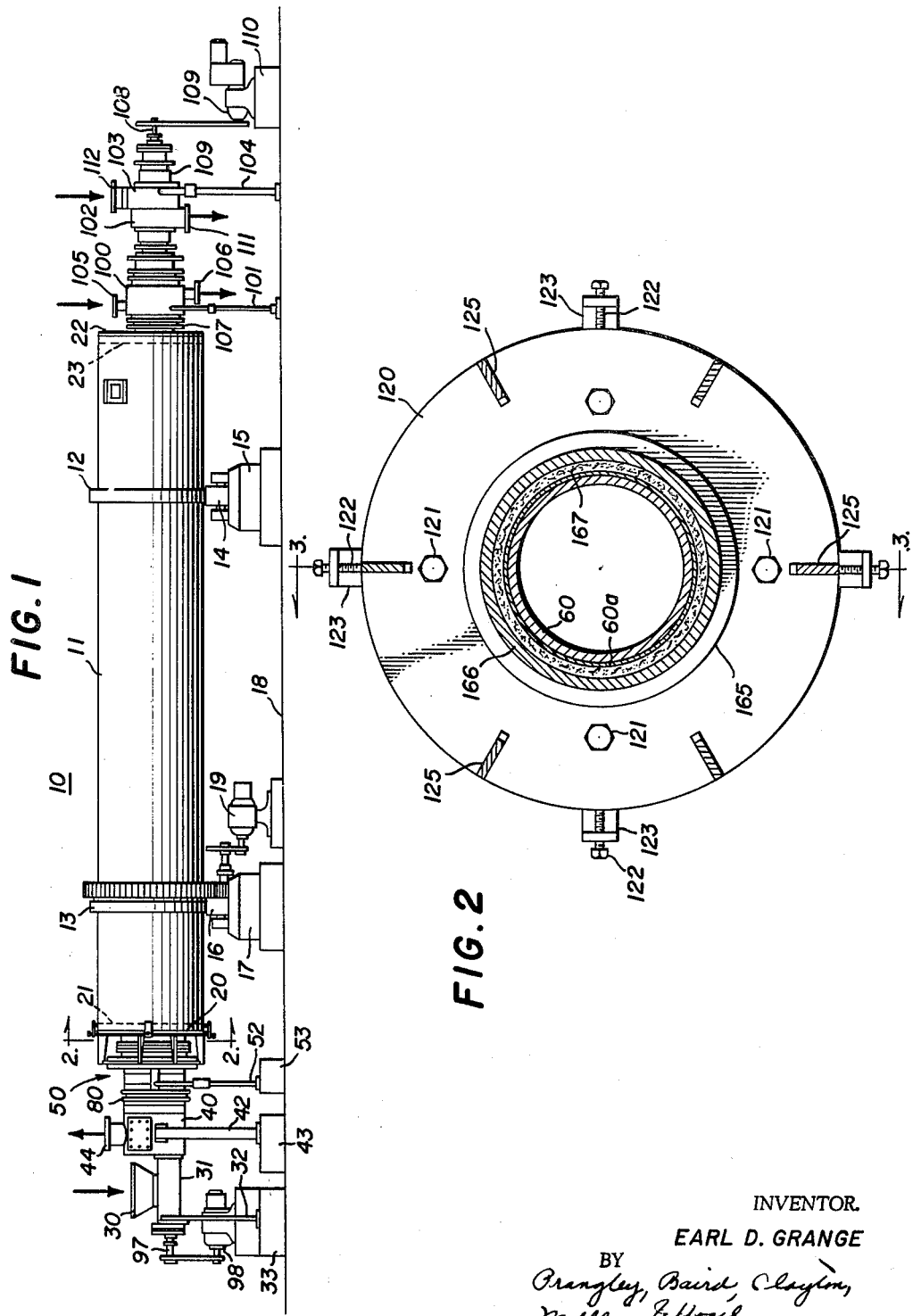
INVENTOR.
EARL D. GRANGE
BY
ATTORNEYS

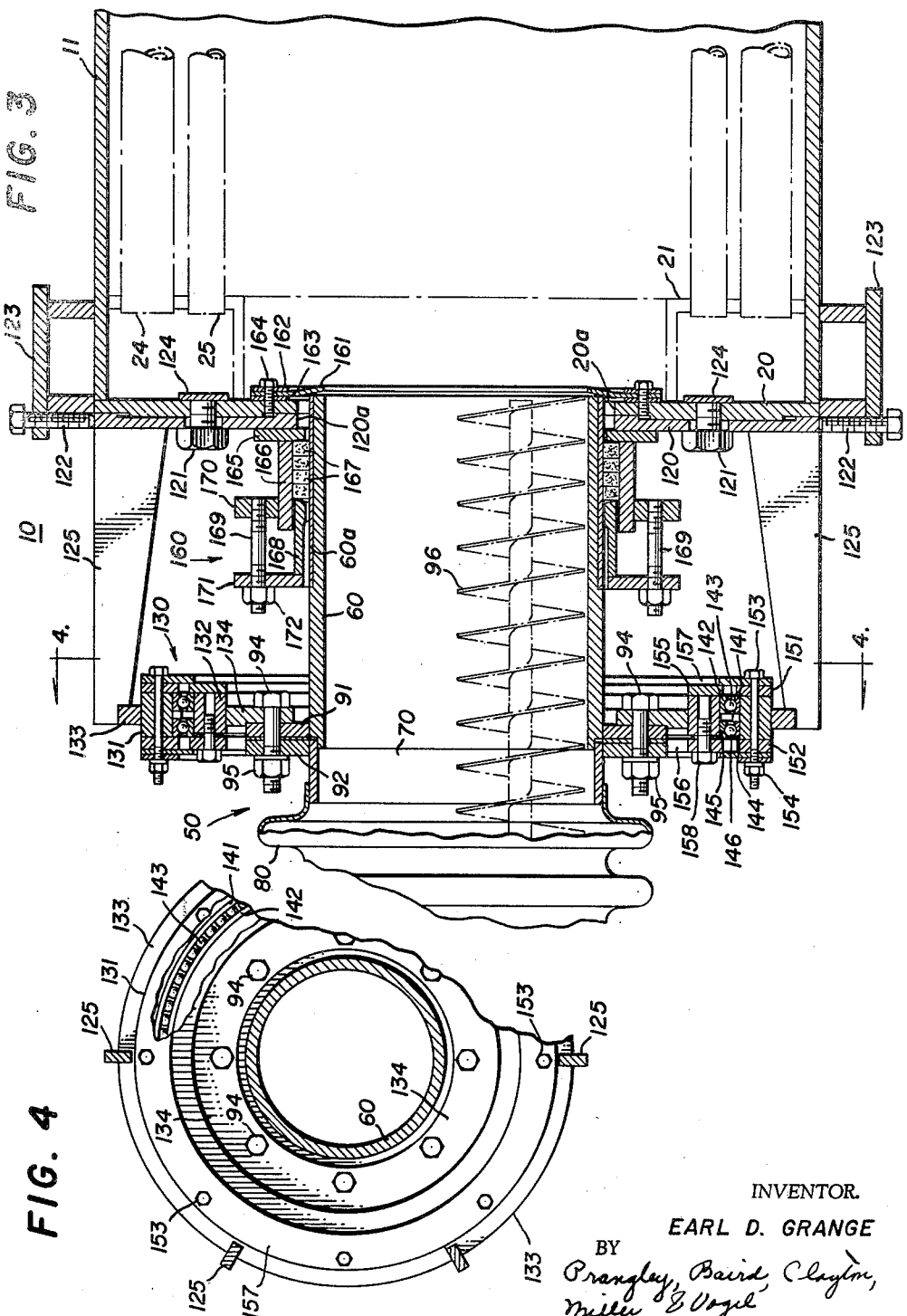

United States Patent Office 3,196,938
Patented July 27, 1965

3,196,938
MATERIAL PROCESSING VESSELS OF THE ROTARY TYPE
Earl D. Grange, Evergreen Park, Ill., assignor to General American Transportation Corporation, Chicago, Ill., a corporation of New York
Filed Nov. 6, 1961, Ser. No. 150,400
7 Claims. (Cl. 165—88)

The present invention relates to material processing vessels of the rotary type, and more particularly to such vessels that are especially adapted for continuously processing materials that require heating or cooling or chemical reactions in special atmosphere.

It is a general object of the invention to provide an improved material processing vessel of the rotary type may be readily utilized as a dryer, calciner or reaction vessel, in which the material is continuously introduced thereinto at one end thereof and is continuously removed therefrom at the other end thereof, after having undergone the particular treatment or reaction desired within the continuously rotating vessel.

Another object of the invention is to provide a material processing vessel of the rotary type that comprises an improved arrangement for guiding the rotation of the inlet end of the vessel with respect to an associated tubular sleeve projecting into an inlet opening provided in the adjacent end wall thereof and through which the material to be processed is supplied into the adjacent end of the vessel.

A further object of the invention is to provide in a rotary processing vessel, an improved guiding arrangement of the character noted that incorporates anti-friction bearing structure including a pair of cooperating annular bearing members that are respectively carried by the end wall of the rotatable vessel and by the associated tubular sleeve, whereby the rotation of the end wall of the vessel is guided in a path disposed about the sleeve and substantially concentric therewith.

Further features of the invention pertain to the particular arrangement of the elements of the rotary processing vessel, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view of a rotary processing vessel embodying the present invention;

FIG. 2 is an enlarged lateral sectional view taken immediately adjacent to the inlet end of the vessel, this view being taken along the line 2—2 in FIG. 1;

FIG. 3 is an enlarged fragmentary longitudinal sectional view taken at the inlet end of the vessel, this view being taken in the direction of the arrows along the line 3—3 in FIG. 2; and FIG. 4 is a reduced lateral sectional view taken adjacent to the bearing structure incorporated between the inlet end of the vessel and the associated tubular sleeve through which the material to be processed is introduced into the adjacent end of the vessel, this view being taken in the direction of the arrows along the line 4—4 in FIG. 3.

Referring now to FIG .1 of the drawings, the rotary material processing vessel 10 there illustrated and embodying the features of the present invention is of general utility, as a dryer, calciner or reaction vessel, however, the same is especially useful in carrying out one step of the so-called "Slovay" process for producing sodium carbonate. More particularly in this step, sodium bicarbonate that has been produced by precipitation in an earlier step in this process, is introduced into one end of the vessel 10 in a continuous basis, wherein the sodium bicarbonate is heated and reacted therein, as it is continuously conducted therethrough, with the result that the sodium bicarbonate is converted or reacted to produce sodium carbonate, water and carbon dioxide. The desired product, sodium carbonate, is continuously discharged from the other end of the vessel 10, while the water vapor and the carbon dioxide are recovered from the vessel, for further use of the carbon dioxide in the overall Solvay process, all in a manner well understood in the commercial production of sodium carbonate.

More particularly, the material processing vessel 10 is of the rotary type comprising an elongated tubular or cylindrical shell 11 that is mounted in a generally horizontal position for rotation about its longitudinal axis by a pair of longitudinal spaced-apart rings 12 and 13 respectively rigidly secured to the exterior of the shell 11. The ring 12 cooperates with rotatable supporting structure 14 that is carried by a pedestal 15; and the ring 12 cooperates with rotatable supporting structure 16 that is carried by a pedestal 17; the pedestals 15 and 17 being carried by a rigid floor or support, indicated at 18. The rotatable supporting structure 16 is driven by associated mechanism, including an electric drive motor, indicated at 19; whereby operation of the drive motor 19 effects driving of the rotatable supporting structure 16 and the consequent rotation of the shell 11 in its mounted position and about its longitudinal center line. In this mounting and driving arrangement, the supporting structures 14 and 16 respectively engaging the rings 12 and 13 accommodate limited longitudinal movements of the shell 11 without impairing the drive between the electric motor 19 and the shell 11, all in a conventional manner.

The left-hand or inlet end of the shell 11 is closed by an associated annular end wall 20; and arranged within the inlet end of the shell 11 adjacent to the end wall 20 is a manifold 21. Similarly, the right-hand or outlet end of the shell 11 is closed by an associated annular end wall 22; and arranged within the outlet end of the shell 11 adjacent to the end wall 22 is a manifold 23. The two manifolds 21 and 23 are interconntecd by a plurality of longitudinally extending outer conduits 24 and a plurality of longitudinally extending inner conduits 25, arranged within the shell 11 and adapted to contact the material being processed therein; and through the conduits 24 and 25, there is conducted a suitable heat-exchange fluid that may be either hot or cold, as required in the processing of the particular material in the vessel 10. In the present example, and as a matter of convenience, it is assumed that the material undergoing the processing in the vessel 10 requires heating and drying, whereby a hot fluid, such as hot oil or steam, is conducted through the conduits 24 and 25 and between the manifolds 23 and 21 for the heating purpose.

Further, the vessel 10 comprises a material supply hopper 30 that is disposed longitudinally outwardly with respect to the inlet or left-hand end of the shell 11; which hopper 30 terminates in a substantially tubular casing 31 that is rigidly externally supported by an associated post 32 that is carried by a pedestal 33 that is, in turn, carried by the floor 18. Also, the vessel 10 comprises a discharge gas casing 40 that is disposed longitudinally outwardly with respect to the inlet or left-hand end of the shell 11 and that is disposed immediately adjacent to the outlet or right-hand end of the casing 31; which discharge gas casing 40 is rigidly externally supported by an associated post 42 that is carried by a pedestal 43 that is, in turn, carried by the floor 18.

Further, the vessel 10 comprises tubular structure 50 that is disposed between the inlet or left-hand end of the shell 11 and the outlet or right-hand end of the discharge gas casing 40; which tubular structure 50 comprises, as best shown in FIG. 3, an elongated tubular inner sleeve 60, a short tubular outer sleeve 70 and an elongated substantially bellows-like tubular structure 80. In the arrangement, the two sleeves 60 and 70 are rigidly secured together, as more fully explained hereinafter; and the two sleeves 60 and 70 are rigidly externally supported by an associated post 52 that is carried by a pedestal 53 that is, in turn, carried by the floor 18. In the arrangement, the inner end of the inner sleeve 60 projects through a substantially centrally disposed material inlet opening 20a provided in the end wall 20 closing the left-hand or inlet end of the shell 11, and the outer end of the inner sleeve 60 is rigidly connected to the adjacent inner end of the outer sleeve 70 by a pair of rings 91 and 92 respectively rigidly secured to the exterior surfaces of the adjacent ends of the sleeves 60 and 70; which rings 91 and 92 are rigidly secured together by a plurality of bolts 94 carrying cooperating nuts 95.

The outer or left-hand end of the outer sleeve 70 is, in turn, connected to the inner or right-hand end of the flexible bellows-like structure 80; and the outer or left-hand end of the flexible bellows-like structure 80 is connected to the inner or right-hand end of the gas discharge casing 40. Thus, it will be understood that the connection of the left-hand end of the bellows-like structure 80 to the stationary gas discharge casing 40 prevents or restrains the bellows-like structure 80, together with the sleeves 60 and 70, against rotation with the shell 11 in an obvious manner. However, the flexibility of the bellows-like structure 80 in the longitudinal direction accommodates limited movements of the two sleeves 60 and 70 with respect to the gas discharge casing 40 and with respect to the shell 11 in an obvious manner; while the outer or left-hand end of the discharge gas casing 40 is rigidly secured to the inner or right-hand end of the material supply casing 31. Also, the discharge gas casing 40 comprises at the upper portion thereof, a gas outlet fitting 44, as shown in FIG. 1.

In the arrangement, the floor 18 may be substantially horizontally disposed, while the pedestal 17 is slightly higher than the pedestal 15 so that the shell 11 is disposed in a position slightly inclined to the horizontal with the end wall 20 adjacent to the inlet or left-hand end thereof slightly elevated with respect to the end wall 22 adjacent to the outlet or right-hand end thereof; and more particularly, this forward and downward pitch of the center line of the shell 11 may be approximately ⅛ inch per foot. In a similar manner, the height of the pedestal 53 is related to the height of the pedestal 17, so that the center line of the tubular structure 50 is forwardly and downwardly pitched and substantially coincident with the center line of the shell 11. Furthermore, the heights of the pedestals 43 and 33 are related to the height of the pedestal 53 so that the center line of the bottom of the discharge gas casing 40 and the center line of the material supply casing 31 are both forwardly and downwardly pitched and substantially coincident with each other and arranged below the center line of the shell 11.

Further, a material feed mechanism in the form of a helical screw 96 is arranged mutually in the material supply casing 31, in the bottom of the discharge gas casing 40 and in the bottom of the tubular structure 50; and more particularly, the helical material feed screw 96 is arranged in the bottom of the sleeves 60 and 70 and in the bottom of the bellows-like structure 80, as clearly indicated in FIG. 3. The extreme outer end of the helical feed screw 96 terminates in a drive shaft 97 that projects through the extreme left-hand end wall of the material supply casing 31; which drive shaft 97 is suitably connected to an associated electric drive motor 98 that is carried by the pedestal 33.

In view of the foregoing, it will be understood that when the drive motor 98 is operated, the material to be processed in the vessel 10 is supplied via the hopper 30 into the material supply casing 31, and that from the material supply casing 31 the material is moved or fed by the rotating helical feed screw 96 through the lower portion of the discharge casing 40 and then through the flexible bellows-like structure 80 and ultimately through the two sleeves 70 and 60, and finally through the material inlet opening 20a provided in the end wall 20 into the associated inlet or left-hand end of the shell 11, as best illustrated in FIG. 3.

Further, the vessel 10 comprises a heat-exchange fluid casing 100 that is disposed longitudinally outwardly with respect to the outlet or right-hand end thereof; which heat-exchange fluid casing 100 is rigidly externally supported by an associated post 101 that is carried by the floor 18. Further, the vessel 10 comprises a material discharge casing 102 and a treatment atmosphere supply casing 103 that are rigidly connected together and disposed longitudinally outwardly with respect to the heat-exchange fluid casing 100; which casings 102 and 103 are rigidly externally supported by an associated post 104 that is carried by the floor 18.

The casings 100, 102 and 103 may be entirely conventional, and generally of the construction and arrangement of that disclosed in U.S. Patent No. 2,848,198, granted on August 19, 1958 to Clifford E. Bill. More particularly, the heat-exchange fluid casing 100 comprises an inlet fitting 105 that is adapted to receive hot heat-exchange fluid to be supplied into the adjacent manifold 23 provided in the outlet or right-hand end of the shell 11 and an outlet fitting 106 that is adapted to receive warm or spent heat-exchange fluid from the adjacent manifold 23. The hot fluid is supplied via the inlet fitting 105 into the casing 100 and is thence conducted through an associated hermetic seal 107 extending through a substantially centrally disposed material outlet opening, not shown, provided in the adjacent end wall 22 closing the outlet or right-hand end of the vessel 11. From the hermetic seal 107, the hot fluid is conducted into the adjacent manifold 23 provided in the outlet or right-hand end of the shell 11; and from the manifold 23, the hot fluid is conducted via the conduits 24 and 25 into the manifold 21 provided in the inlet or left-hand end of the shell 11. The spent or warm fluid is also conducted from the manifold 23 via the hermetic seal 107 into the casing 100 and thence to the exterior through the outlet fitting 106. Thus it will be understood that the hot heat-exchange fluid that is circulated through the conduits 24 and 25 provided in the shell 11 heat the material for the processing purpose.

As the shell 11 is rotated, the material supplied to the inlet or left-hand end thereof is moved therethrough toward the outlet or right-hand end thereof, by virtue of the downward and forward pitch of the shell 11, as previously explained; and further, the vessel 10 comprises mechanism, not shown, arranged in the outlet or right-hand end thereof for feeding the processed material from the shell 11 through the hermetic seal 107 and the heat exchange fluid casing 100 into the material discharge casing 102; which mechanism includes a helical feed screw, not shown. The extreme right-hand end of this helical feed screw terminates in an operating shaft 108 that projects from the extreme right-hand end of the associated casing structure 109 carried by the right-hand end of the treatment atmosphere supply casing 103; which operating shaft 108 is driven by an associated electric drive motor 109 that is carried by a pedestal 110 that is, in turn, supported by the floor 18.

In view of the foregoing, it will be understood that when the electric drive motor 109 is operated, the helical feed screw mentioned is rotated through the drive shaft 108, whereby the processed material is fed from the outlet or right-hand end of the shell 11 through the elements 107 and 100 into the material discharge casing 102; and from the material discharge casing 102, the processed material is dropped through the associated outlet fitting 111; which processed material is suitably conveyed to storage for subsequent commercial use, as required.

Any treatment atmosphere, such as air, carbon dioxide, or the like, that is required in the vessel 10 is supplied to an inlet fitting 112 that is carried by the treatment atmosphere supply casing 103; which treatment atmosphere is then conducted through the elements 102, 100 and 107 into the adjacent outlet or right-hand end of the shell 11. The treatment atmosphere passes through the shell 11 sweeping the material undergoing the processing operation, whereby the same, together with any gases given off by the material undergoing the processing, are swept from the inlet or left-hand end of the shell 11 through the tubular structure 50 into the discharge gas casing 40 from which it is conducted to the exterior through the outlet fitting 44.

Further, the vessel 10 comprises mechanism for guiding the rotation of the end wall 20 arranged at the inlet or left-hand end thereof in a path disposed about the sleeves 60 and 70 and substantially therewith, thereby eliminating an objectionable operating characteristic of conventional rotary processing vessels of this type. More particularly, there is a normal tendency in a conventional processing vessel of this type for the inlet end thereof to wobble or to rotate eccentrically with respect to the longitudinal center line thereof, due fundamentally to the forward and downward pitch of the shell thereof and to the accumulation of the material undergoing the processing action in the outlet end of the vessel.

More particularly, the mechanism for guiding the rotation of the end wall 20 in a path disposed about the sleeves 60 and 70 and substantially concentric therewith comprises, as best shown in FIGS. 2 and 3, an annular plate 120 that is carried by the exterior surface of the end wall 20 and rigidly secured thereto, as by welding, not shown, the annular plate 120 having a substantially centrally disposed opening 120a therein and arranged in surrounding relation with respect to the inner end of the inner sleeve 60 extending through the opening 120a. More particularly, the annular plate 120 is initially secured to the adjacent outer surface of the end wall 20 by a plurality of circumferentially spaced-apart bolts 121; and thereafter, the radial position of the plate 120 is suitably adjusted with respect to the end wall 20 by a plurality of cooperating set screws 122 respectively carried by a plurality of brackets 123 respectively secured to the periphery of the end wall 20 and to the adjacent left-hand end of the shell 11 so as to achieve concentricity between the plate 120 and the longitudinal center line of the shell 11. Thereafter, the set screws 122 are tightened in order securely to retain the plate 120 in its adjusted position of concentricity; whereupon the bolts 121 may be removed. At this time, the plate 120 is suitably welded to the adjacent end wall 20, and the shanks of the bolts 121 are cut-off or shortened. Then the bolts 121 are replaced in the cooperating threaded openings provided in the end wall 20 and securely tightened. Ultimately, the ends of the shanks of the bolts 121 may be closed by cooperating plugs 124 suitably secured, as by welding, to the inner surface of the end wall 20. In any case, the plate 120 is rigidly secured to the adjacent outer surface of the end wall 20 in a position concentric with the longitudinal center line of the shell 121; and the plate 11 carries adjacent to the radially outer portion thereof six circumferentially spaced-apart and longitudinally outwardly projecting arms 125, as best shown in FIGS. 3 and 4.

Also, this mechanism comprises an anti-friction bearing structure, indicated generally at 130, and including an outer annular bearing support 131 rigidly secured to the outer ends of the arms 125 carried by the annular plate 120 and an inner annular bearing support 132 rigidly secured to the annular rings 91 and 92 that are, in turn, rigidly secured to the adjacent ends of the two sleeves 60 and 70 at the junction therebetween. More particularly, the outer bearing support 131 is rigidly secured, as by welding, to a surrounding ring 133, that is, in turn, welded to the extreme outer ends of the arms 125, while the inner bearing support 132 is rigidly secured, as by welding, to a surrounded ring 134 that is, in turn, secured to the annular rings 91 and 92 by the previously described series of bolts 94. Arranged between the bearing supports 131 and 132 are inner and outer sets of ball bearing structures. The inner ball bearing structure includes outer and inner races 141 and 142, between which an annular array of rotatable elements or balls 143 are arranged; and similarly, the outer ball bearing structure includes outer and inner races 144 and 145, between which an annular array of rotatable elements or balls 146 are arranged. The outer races 141 and 144 are securely clamped to the outer bearing support 131 by a pair of rings 151 and 152 disposed on opposite sides of the outer bearing support 131 and secured in place thereupon by a plurality of bolts 153 respectively provided with a plurality of nuts 154. Similarly, the inner races 142 and 145 are securely clamped to the inner bearing support 132 by a pair of rings 155 and 156 disposed on opposite sides of the inner bearing support 132. The ring 155 is clamped in place by an associated ring 157 that is also secured to the ring 151 by the series of bolts 153, while the ring 156 is secured in place by a series of bolts 158 carried by the inner bearing support 132.

Accordingly, it will be understood that when the shell 11 is rotated, the end wall 20 rotating therewith effects corresponding concentric rotation of the plate 120 carrying the arms 125, with the result that the outer bearing support 131 rigidly secured to the outer ends of the arms 125 is rotated concentric with the longitudinal axis of the shell 11. The outer bearing support 131 is, in turn concentrically supported for rotation upon the stationary inner bearing support 132 that is supported in a concentric position upon the two sleeves 60 and 70 adjacent to the junction therebetween. Specifically, the outer bearing support 131 is supported upon the inner bearing support 132 by the ball bearing structures including the rotatable outer races 141 and 144 that are clamped to the outer bearing support 131 and by the stationary inner races 142 and 145 that are clamped to the inner bearing support 132, together with the two annular series of rotating balls 143 and 146 respectively arranged between the races 141, 142 and the races 144, 145. Accordingly, the anti-friction bearing structure 130 insures that the end wall 20 closing the adjacent inlet or left-hand end of the shell 11 is rotated in guided relation about the stationary sleeves 60 and 70 in a path disposed thereabout and substantially concentric therewith.

Further, the vessel 10 comprises sealing structure 160 disposed between the rotatable elements 20 and 120 and the stationary inner sleeve 60 and positioned longitudinally inwardly with respect to the anti-friction bearing structure 130. More specifically, an annular gasket 161 is carried by the interior surface of the end wall 20 and disposed in overlapping relation with respect to the adjacent extreme inner end of the stationary inner sleeve 60, the gasket 161 being formed of a suitable flexible material, such as a rubberized fabric, or the like, and preventing entry of the material in the vessel 10 into the annular space between the extreme inner end of the inner sleeve 60 and the material inlet opening 20a provided in the end wall 20. More specifically, the outer periphery of the gasket 161 is clamped between two rings 162 and 163 that, in turn, are retained in place upon the interior surface of the end wall 20 about the material inlet opening 20a provided therein by an annular series of bolts 164.

Further, the sealing structure 160 comprises an annular ring 165 that is rigidly secured to the exterior surface of the plate 120 and hermetically sealed thereto, as by welding, and a tubular sleeve 166 carried by the annular ring 165 and hermetically sealed thereto, as by welding. The sleeve 166 projects longitudinally outwardly from the ring 165 and surrounds an adjacent section of the inner end of the stationary inner sleeve 60 so as to provide an annular packing space therebetween; and a series of annular flexible packing rings 167 formed of a suitable wear-resistant material are arranged within the packing space mentioned and surrounded by the tubular sleeve 166. Also, the exterior surface of the stationary inner sleeve 60 carries adjacent to the inner end thereof a hardened sleeve 60a that is rigidly secured and sealed thereto; which wear sleeve 60a engages the inner peripheral edges of the packing rings 167. Further, the sealing structure 160 comprises an annular follower 168 surrounding the adjacent outer portion of the wear sleeve 60a and having an inner end disposed within the previously mentioned packing space and in engagement with the adjacent outer packing ring 167; which follower 168 is secured to the tubular sleeve 166 by an annular series of studs 169. Specifically, the inner end of each of the studs 169 is threaded into an opening provided in a lug 170 that is rigidly secured to the outer end of the tubular sleeve 166, and the outer end of each of the studs 169 projects through a clear hole provided in a lug 171 that is rigidly secured to the outer end of the follower 168. Finally, the extreme outer end of each of the studs 169 carries a nut 172 disposed in engagement with the adjacent outer surface of the lug 171.

Accordingly, it will be understood that upon proper tightening of the nuts 172, the follower 168 may be moved longitudinally inwardly toward the ring 165 within the packing space provided between the tubular sleeve 166 and the wear sleeve 60a, whereby the extreme inner end of the follower 168 compresses the several packing rings 167 in order to force them into firm sealed engagements with the interior surface of the tubular sleeve 166 and with the exterior surface of the wear sleeve 60a, thereby to provide a hermetically sealed joint between the rotatable elements 20, 120, 165, 166 and 168 and the stationary wear sleeve 60a. In the sealing structure 160, the packing rings 167 are rotatable with the tubular sleeve 166, whereby they are disposed in rotatable sealing engagement with the exterior surface of the wear sleeve 60a in order to perfect the hermetic seal, as described above.

The anti-friction bearing structure 130 maintains the rotation of the end wall 20 concentric with respect to the outer end of the inner sleeve 60, whereby the sealing structure 160 is rotated about the wear sleeve 60a concentric therewith, so as to prevent undue wear of the sealing rings 167 and so as to maintain the hermetic seal between the inlet or left-hand end of the shell 11 and the adjacent inner end of the inner sleeve 60.

In view of the foregoing, it is apparent that there has been provided a material processing vessel of the rotary type that comprises an improved arrangement for guiding the rotation of the inlet end of the vessel with respect to an associated tubular sleeve projecting into the adjacent end wall of the vessel and through which the material to be processed is supplied into the adjacent end of the vessel so that the rotation of the inlet end of the vessel is in a path disposed about the sleeve and substantially concentric therewith. This arrangement eliminates wobble or eccentric rotation of the end of the vessel with respect to the adjacent tubular sleeve, so as to minimize wear of the packing or sealing structure that is disposed between the tubular sleeve and the adjacent end of the vessel and so as to cause true rotation of the vessel about its own axis, as well as the axis of the tubular sleeve, which axes are aligned with each other and pitched forwardly at a slight angle to the horizontal.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A material processing vessel comprising a rigid support, an elongated tubular rigid shell, a first rigid end wall rigidly secured in place in one end of said shell and closing the same and having a substantially centrally disposed material inlet opening therein, a second rigid end wall rigidly secured in place in the other end of said shell and closing the same and having a material outlet opening therein, first means for mounting said shell upon said support and for rotation about its longitudinal axis and in a position disposed slightly inclined to the horizontal and with said first end wall slightly elevated with respect to said second end wall, said first means accommodating limiting movements of said shell relative to said support incident to rotation of said shell, means for rotating said shell in its mounted position, whereby said end walls are rotated therewith, an elongated heat-exchange conduit arranged within said shell and adapted to contact the material being processed therein, a tubular rigid sleeve, second means for mounting said sleeve upon said support and adjacent to said first end wall and slightly inclined with respect to the horizontal and with the outer end thereof slightly elevated with respect to the inner end thereof and with the longitudinal axis of said sleeve substantially coincident with the longitudinal axis of said shell, the inner end of said sleeve projecting into said material inlet opening provided in said first end wall and the outer end of said sleeve extending longitudinally outwardly with respect to said first end wall, annular sealing structure carried by said first end wall and rotatable therewith and arranged in surrounding and sealing engagement with the adjacent exterior surface of said sleeve, said second mounting means restraining said sleeve against rotation about its longitudinal axis and accommodating limited movements thereof relative to said support incident to rotation of said shell, a first rigid bearing support carried by said first end wall and rotatable therewith and positioned longitudinally outwardly with respect to said sealing structure, a second rigid bearing support carried by said sleeve adjacent to the outer end thereof and positioned radially inwardly with respect to said first bearing support, and bearing structure including a pair of cooperating rigid bearing members respectively carried by said first and second bearing supports for guiding the rotation of said first end wall in a path disposed about said sleeve and substantially concentric therewith and for preventing relative radial movements between said first end wall and said sleeve.

2. The material processing vessel set forth in claim 1, wherein said bearing structure is of the anti-friction type and includes an annular array of rolling elements arranged between and in rolling contact with said bearing members.

3. A material processing vessel comprising a rigid support, an elongated tubular rigid shell, a first rigid end wall rigidly secured in place in one end of said shell and closing the same and having a substantially centrally disposed material inlet opening therein, a second rigid end wall rigidly secured in place in the other end of said shell and closing the same and having a material outlet opening therein, first means for mounting said shell upon said support and for rotation about its longitudinal axis and in a position disposed slightly inclined to the horizontal and with said first end wall slightly elevated with respect to said second end wall, said first mounting means accommodating limited movements of said shell relative to said support incident to rotation of said shell, means for rotating said shell in its mounted position, whereby said end walls are rotated therewith, an elongated heat-exchange conduit arranged within said shell and adapted to contact the material being processed therein, a tubular rigid sleeve, second means for mounting said sleeve upon said support and adjacent to said first end wall and slightly inclined with respect to the horizontal and with the outer end thereof slightly elevated with respect to the inner end thereof and with the longitudinal axis of said sleeve substantially coincident with the longitudinal axis of said shell, the inner end of said sleeve projecting into said material inlet opening provided in said first end wall and the outer end of said sleeve extending longitudinally outwardly with respect to said first end wall, an annular rigid plate secured to the exterior of said first end wall and rotatable therewith and arranged in surrounding relation with the adjacent inner end of said sleeve extending therethrough, means for adjusting the position of said plate radially with respect to said material inlet opening provided in said first end wall and with respect to the adjacent inner end of said sleeve extending therethrough, annular sealing structure carried by the radially inner portion of said plate and rotatable therewith and arranged in surrounding and sealing engagement with the adjacent exterior surface of said sleeve, said second mounting means restraining said sleeve against rotation about its longitudinal axis and accommodating limited movements thereof relative to said support incident to rotation of said shell, a first rigid bearing support carried by the radially outer portion of said plate and rotatable therewith and positioned longitudinally outwardly with respect to said sealing structure, a second rigid bearing support carried by said sleeve adjacent to the outer end thereof and positioned radially inwardly with respect to said first bearing support, and bearing structure including a pair of cooperating rigid bearing members respectively carried by said first and second bearing supports for guiding the rotation of said first end wall in a path disposed about said sleeve and substantially concentric therewith and for preventing relative radial movements between first end wall and said sleeve.

4. A material processing vessel comprising a rigid support, an elongated tubular rigid shell, a first rigid end wall rigidly secured in place in one end of said shell and closing the same and having a substantially centrally disposed material inlet opening therein, a second rigid end wall rigidly secured in place in the other end of said shell and closing the same and having a material outlet opening therein, first means for mounting said shell upon said support and for rotation about its longitudinal axis and in a position disposed slightly inclined to the horizontal and with said first end wall slightly elevated with respect to said second end wall, said first mounting means accommodating limited movements of said shell relative to said support incident to rotation of said shell, means for rotating said shell in its mounted position, whereby said end walls are rotated therewith, an elongated heat-exchange conduit arranged within said shell and adapted to contact the material being processed therein, a tubular rigid sleeve, second means for mounting said sleeve upon said support and adjacent to said first end wall and slightly inclined with respect to the horizontal and with the outer end thereof slightly elevated with respect to the inner end thereof and with the longitudinal axis of said sleeve substantially coincident with the longitudinal axis of said shell, the inner end of said sleeve projecting into said material inlet opening provided in said first end wall and the outer end of said sleeve extending longitudinally outwardly with respect to said first end wall, an annular rigid plate rigidly secured to the exterior of said first end wall and rotatable therewith and arranged in surrounding relation with the adjacent inner end of said sleeve extending therethrough, annular sealing structure carried by the radially inner portion of said plate and rotatable therewith and arranged in surrounding and sealing engagement with the adjacent exterior surface of said sleeve, said second mounting means restraining said sleeve against rotation about its longitudinal axis and accommodating limited movements thereof relative to said support incident to rotation of said shell, a plurality of circumferentially spaced-apart rigid arms carried by the radially outer portion of said plate and rotatable therewith and extending longitudinally outwardly with respect thereto, a first rigid annular bearing support carried by the outer ends of said arms and rotatable therewith and positioned longitudinally outwardly with respect to said sealing structure and surrounding said sleeve adjacent to the outer end thereof, a second rigid annular bearing support carried by said sleeve and surrounding the same adjacent to the outer end thereof and positioned radially inwardly with respect to said first bearing support, and anti-friction bearing structure for guiding the rotation of said first end wall in a path disposed about said sleeve and substantially concentric therewith and for preventing radial movements between said first end wall and said sleeve, said anti-friction bearing structure including concentric outer and inner rigid races respectively carried by said first and second bearing supports and an annular array of rolling elements arranged between said races.

5. The material processing vessel set forth in claim 1, and further comprising an elongated material conveying device arranged longitudinally in the lower portion of said sleeve and operative to supply the material to be processed from the exterior through said sleeve and into said one end of said shell.

6. The material processing vessel set forth in claim 1, wherein said sealing structure includes a tubular rigid wear member rigidly secured and sealed to the exterior surface of said sleeve, a tubular rigid sealing element rigidly secured and sealed to said first end wall and rotatable therewith and projecting longitudinally outwardly therefrom into surrounding relation with said wear member and spaced radially outwardly therefrom, and a resilient packing ring arranged in the annual space disposed between said wear member and said sealing element and rotatable with said sealing element and sealing together the adjacent surfaces of said wear member and said sealing element.

7. A material processing vessel comprising a rigid support, an elongated tubular rigid shell, a first rigid end wall rigidly secured in place in one end of said shell and closing the same and having a substantially centrally disposed material inlet opening therein, a second rigid end wall rigidly secured in place in the other end of said shell and closing the same and having a material outlet opening therein, first means for mounting said shell for rotation about its longitudinal axis and in a position disposed slightly inclined to the horizontal and with said first end wall slightly elevated with respect to said second end wall, said first mounting means accommodating limited movements of said shell relative to said support incident to rotation of said shell, means for rotating said shell in its mounted position, whereby said end walls are rotated therewith, an elongated heat-exchange conduit arranged within said shell and adapted to contact the material being processed therein, a tubular rigid sleeve, second means for mounting said sleeve upon said support and disposed adjacent to said first end wall and slightly inclined with respect to the horizontal and with the outer end thereof slightly elevated with respect to the inner end thereof and with the longitudinal axis of said sleeve substantially coincident with the longitudinal axis of said shell, the inner end of said sleeve projecting into said material inlet opening provided in said first end wall and the outer end of said sleeve extending longitudinally outwardly with respect to said first end wall, annular sealing structure carried by said first end wall and rotatable therewith and arranged in surrounding and sealing engagement with the adjacent exterior surface of said sleeve, said second mounting means restraining said sleeve against rotation about its longitudinal axis and accommodating limited movements thereof relative to said support incident to rotation of said shell, a first rigid bearing support carried by said first end wall and rotatable therewith and positioned longitudinally outwardly with respect to said sealing structure, a second rigid bearing support carried by said sleeve adjacent to the outer end thereof and positioned radially inwardly with respect to said first bearing support, bearing structure including a pair of cooperating rigid bearing members respectively carried by said first and second bearing supports for guiding the rotation of said first end wall in a path disposed about said sleeve and substantially concentric therewith and for preventing relative radial movements between said first end wall and said sleeve, a material supply hopper provided with a casing having an open inner end, means for mounting said casing in a stationary position upon said support and disposed longitudinally outwardly with respect to said sleeve, means including a flexible bellows-like structure for interconnecting the outer end of said sleeve and the inner end of said casing and for accommodating limited relative movements of said sleeve with respect to said casing, and means including an elongated material conveying device arranged longitudinally in the lower portion of said sleeve and cooperating with said bellows-like structure for supplying the material to be processed from said supply hopper through said bellows-like structure and thence through said sleeve into said one end of said shell.

References Cited by the Examiner

UNITED STATES PATENTS

| | | | |
|---|---|---|---|
| 750,051 | 1/04 | Geiger | 34—141 |
| 848,362 | 3/07 | Geiger | 165—88 |
| 2,603,457 | 7/52 | Bishop | 165—89 |
| 2,848,198 | 8/58 | Bill | 165—88 |
| 2,973,946 | 3/61 | Bauling et al. | 165—88 X |

FOREIGN PATENTS 580,797   8/59   Canada.

CHARLES SUKALO, *Primary Examiner.*

FREDERICK L. MATTESON, Jr., *Examiner.*